United States Patent [19]
Winstead

[11] Patent Number: 5,129,728
[45] Date of Patent: Jul. 14, 1992

[54] DYNAMIC MIXING SYSTEM AND METHOD FOR PRODUCING THERMOPLASTIC MATERIALS

[76] Inventor: Thomas W. Winstead, 2 Overlook La., Baltimore, Md. 21210

[21] Appl. No.: 752,967

[22] Filed: Aug. 29, 1991

Related U.S. Application Data

[63] Continuation of Ser. No. 505,511, Apr. 6, 1990, abandoned.

[51] Int. Cl.[5] ............................................. B29B 1/06
[52] U.S. Cl. ..................................... 366/79; 366/91; 366/97; 366/287; 425/207
[58] Field of Search .................. 366/79, 81, 88, 89, 366/90, 91, 96, 97, 98, 318, 319, 322, 323, 336, 338, 272, 287; 425/207, 208; 264/50, 51

[56] References Cited

U.S. PATENT DOCUMENTS

| | | |
|---|---|---|
| 2,167,700 | 8/1939 | White . |
| 3,443,798 | 5/1969 | Overcashier . |
| 3,530,534 | 9/1970 | Pomper . |
| 3,751,015 | 8/1973 | Hensen ........................ 366/81 |
| 3,771,774 | 11/1973 | Hook . |
| 3,944,192 | 3/1976 | Farrell . |
| 4,004,788 | 1/1977 | Ronner . |
| 4,103,353 | 7/1978 | Dougherty ..................... 366/81 |
| 4,289,409 | 9/1981 | Brand . |
| 4,344,710 | 8/1982 | Johnson et al. . |
| 4,416,543 | 11/1983 | Brinkmann . |
| 4,454,087 | 6/1984 | Hayashi et al. . |
| 4,659,230 | 4/1987 | Son et al. . |
| 4,746,478 | 5/1988 | Fujisaki ........................ 425/208 |

FOREIGN PATENT DOCUMENTS

| | | |
|---|---|---|
| 0093553 | 11/1983 | European Pat. Off. . |
| 0104728 | 4/1984 | European Pat. Off. . |
| 82557 | 6/1971 | Fed. Rep. of Germany . |
| 2813318 | 10/1979 | Fed. Rep. of Germany . |
| 3733565 | 8/1988 | Fed. Rep. of Germany . |
| 59-19527 | 2/1984 | Japan . |
| 300974 | 9/1964 | Netherlands . |
| 9008595 | 8/1990 | PCT Int'l Appl. . |
| 848514 | 9/1960 | United Kingdom . |

*Primary Examiner*—Robert W. Jenkins

[57] ABSTRACT

A dynamic mixing system and method intensively mixes thermoplastic melt with other ingredients and entrains gas as a blowing agent in a thermoplastic melt so as to provide a foamed thermoplastic extrudate. The dynamic mixing system includes a plurality of mixing balls disposed circumferentially about the surface of a cylindrically shaped spindle which is rotatably disposed within a barrel, such that upon rotation of the spindle the mixing balls rotate in a planetary manner so as to intensively mix a flow of thermoplastic melt, for example, to entrain a blowing agent in the melt.

42 Claims, 4 Drawing Sheets

DYNAMIC MIXING SYSTEM AND METHOD FOR PRODUCING THERMOPLASTIC MATERIALS

This application is a continuation of application Ser. No. 07/505,511 filed on Apr. 6, 1990, now abandoned.

FIELD OF THE INVENTION

This invention relates to a dynamic mixing system and method for the production of thermoplastic materials in the form of extrudates and more particularly, to a dynamic mixing system employing mixing balls and method for intensively mixing ingredients with thermoplastic melt, as well as to the generation of foamed thermoplastic extrudates utilizing blowing agents in addition to fluorocarbons such as air, nitrogen, carbon dioxide, and water either alone or in combinations thereof and other ingredients.

BACKGROUND OF THE INVENTION

The predominant blowing agent for the generation of thermoplastic foam extrudates on a commercial basis has been fluorocarbons, for example, trichlorofluoromethane and dichlorodifluoromethane. As a result of ecological studies, these fluorocarbons have been determined to be an undesirable pollutant for the atmosphere. Accordingly, ways are being sought to eliminate or materially reduce the utilization of fluorocarbons for all purposes wherever possible. A significant area in which to eliminate fluorocarbons from manufacturing processes is in the generation of thermoplastic foam extrudates such as thermoplastic foam sheeting and the like.

In the process of eliminating fluorocarbons, it becomes apparent that if conventional chemical blowing agents also can be successfully eliminated and only harmless ingredients utilized as the blowing agents, then the manufacturing processes for foamed thermoplastic extrudates would become more ecologically sound.

Natural gases such as air, nitrogen or carbon dioxide, all of which have predictable and acceptable effects on the ecology, would be the most desirable types of blowing agent. Water is also a prime candidate for an ecologically sound blowing agent.

In addition to overcoming the above-noted ecological problems, it has been desirable to provide a means and method for agitating the thermoplastic melt to promote better mixing and to eliminate dead regions or stagnation during the mixing process. Previous attempts at improving the mixing conditions for thermoplastic melt have included a plasticizer screw for advancing molten plastic to an injection mold which has a circulating row of balls behind the flights of the screw for agitating the melt to promote better mixing as disclosed by U.S. Pat. No. 3,944,192 to Farrell. Another attempt at achieving better mixing conditions for thermoplastic melt is disclosed by U.S. Pat. No. 3,530,534 to Pomper wherein an extruder includes a screw having a thread structure interrupted with a recess which includes two rows or rings of spherical balls. An attempt at improving mixing conditions for powdery rubber mixtures is disclosed by U.S. Pat. No. 4,416,543 to Brinkmann which describes an apparatus for treating powdery rubber mixtures which includes a toothed central spindle and toothed planetary spindles disposed symmetrically around the central spindle such that the planetary spindles rotate and orbit the central spindle. This system has been in commercial use for thermoplastics as well as where simultaneous mixing and cooling is required. An attempt at improving mixing conditions for processing viscous fluids is disclosed in U.S. Pat. No. 3,443,798 to Overcashier et al wherein a fluid processing device includes a rotor centrally mounted in a cylindrical shell and a plurality of sets of axially staggered orbital rollers located in the annulus between the rotor and the inner wall of the shell. Another approach by Overcashier suggests also the use of making gear teeth on rotor, shell and staggered orbital rollers. Although the devices disclosed by these patents have included gears, balls, spindles or rollers in addition to a centrally rotating core in order to improve mixing conditions, further improved mixing conditions are still sought which provide for more intensive mixing with less shear and less stagnation, as well as the capability of using a variety of blowing agents when foamed thermoplastic materials are to be produced, especially with gases.

It is therefore an object of the present invention to supplant fluorocarbons as a blowing agent for foamed thermoplastic extrudates and the like.

Another object of the present invention is to provide a new and novel method and apparatus for mixing air, nitrogen, carbon dioxide, water and/or combinations thereof in an extrusion system as blowing agents to produce foamed thermoplastic extrudate.

A further object of the invention is to provide a mixing system with minimized plastic inventory so as to reduce residence time after the addition of blowing agents, particularly when air (with oxygen) is used.

Another object of the present invention is to reduce the cost of producing foamed thermoplastic extrudates.

Still another object of the present invention is to provide foamed thermoplastic extrudates of enhanced homogeneous quality.

Yet another object of the present invention is to provide an apparatus which utilizes a plurality of mixing balls which rotate in a planetary manner to intensively mix thermoplastic melt with other ingredients.

Another object of the present invention is to provide a method and apparatus employing mixing balls for use in intensive mixing operations wherein parts of the apparatus are not subjected to disadvantageous wear, as is inherent with systems employing gears and bearings.

It is yet another object of the present invention to provide a method for intensively mixing ingredients with thermoplastic melt wherein a plurality of mixing balls which rotate in a planetary manner are disposed in a staggered arrangement about a spindle rotatably disposed within a barrel so as to impart multiple divisions in a flowing mass of thermoplastic melt which is caused to pass between the surfaces of the mixing balls, spindle and barrel.

An important object of this invention is to provide an effective mixing system with minimum shear in order to avoid heat generation at the same place the temperature of the melt is being reduced.

These and other objects of the present invention will become more fully apparent with reference to the following description and drawings which relate to several preferred embodiments of the invention.

SUMMARY OF THE INVENTION

The dynamic mixing system of the present invention includes in one embodiment a cylindrically shaped hollow barrel with an inner cylindrical surface, a cylindrically shaped spindle rotatably disposed within the barrel, and a plurality of mixing balls disposed in a plurality of circumferential rows about the surface of the spindle with balls in respectively adjacent rows being staggered with one another, wherein the mixing balls move in a planetary manner within the barrel upon rotation of the spindle so as to mix thermoplastic melt received within the barrel. The mixing balls are preferably disposed in a plurality of circumferential rows so as to provide for clearance between adjacent balls within each circumferential row and point contact between the staggered balls from adjacent circumferential rows. The surface of the spindle may either be smooth or it may include a plurality of circumferential grooves which accommodate the circumferential rows of planetary mixing balls so as to allow the arrangement of mixing balls to have greater downstream stress capability, which can reach high levels at ball contact points in the last several rows, when a large number of rows are used without grooves supporting each row of balls independently.

Although reference to "point contact" is made, in practice a thin film of plastic acts as a separating lubricant preventing wear at these points.

A preferred embodiment of the methods of the present invention includes the steps of forming an extruded flowing mass of thermoplastic melt and subjecting the flow to a mixing action by causing the melt to flow into the dynamic mixing system of the present invention which includes mixing balls in a particular configuration within a tubular mixing chamber. The mixing balls impart multiple divisions in the flow of melt from row to row by geometric progression, so as to create a significantly large number of flow divisions thereby enhancing the mixing action. Thus, there is provided a labyrinth of dynamic paths which increase in number by geometric progression from the inlet to the outlet of the dynamic mixer of the present invention. The passage of thermoplastic melt through this labyrinth makes possible the production of commercially acceptable foamed thermoplastic products while obviating the need for blowing agents containing fluorocarbons.

This mixing system is excellent for dispersing color, pigments, fillers, lubricants and other ingredients which can be quite difficult to mix in existing extrusion systems.

The methods of the present invention also include the controlled injection of gases such as air, nitrogen and carbon dioxide and/or water, with or without nucleating agents such as talc, into an extrusion system upstream of the extruding die. Some embodiments also include the addition of chemical blowing agents, which further illustrate the versatility of the methods of the present invention.

Generally, the extrusion systems contemplated by the present invention are of either a single extruder or a tandem extruder configuration with various access points at which controlled amounts of thermoplastic, nucleating agents, gas, water and/or chemical blowing agents can be added to the molten thermoplastic mass being produced by the extrusion system upstream of the extruding die. Examples of single and tandem extrusion systems are described in U.S. Pat. No. 4,436,679 issued Mar. 13, 1984 to Winstead and entitled "Method and Apparatus for Generating Foamed Thermoplastic Materials" which is herein incorporated by reference.

In a preferred single extruder embodiment to the present invention, resin, granulates and a nucleating agent are introduced into the upstream end of an extruder and a controlled volume of water is optionally introduced mid-way between the upstream end and the gate of the extruder valve. The extruder barrel includes a gas injection port as well as the dynamic mixing system of the present invention disposed near the downstream or output end thereof. After gas injection and mixing action, the extrudate output of the extruder passes through a screen changer and a gear pump. The final foam produced emanates from the extrusion die. A transducer may be provided to control the speed of the extruder and thus maintain constant pressure at the gas injection point in the system. This constant pressure ensures a substantially uniform flow of compressible gas into the molten extrudate upstream of the mixer and cooler system of this invention to ensure a homogeneous product. The water optionally injected into the extruder barrel is accomplished by the use of a metering pump or the like.

In an alternative preferred single extruder embodiment, the dynamic mixing system of this invention is located downstream of the screen changer and gear pump so as to deliver thoroughly mixed and cooled extrudate with entrained blowing agent, as desired, to the extrusion die from which it is emitted in the form of foam sheeting.

Typical examples of flow rates of molten polystyrene extrudate would be on the order of one hundred fifty to three hundred pounds per hour; if water is introduced into the extruder barrel, it's pressures may range from 750–4000 PSIG. Gas is introduced into the injector at a delivery pressure from 250–4000 PSIG; and the extrudate is fed to the extrusion die at a temperature of approximately 300° F. All of these parameters are approximate but represent desired orders of magnitude in the process of the present invention to produce, for example, polystyrene foams of the densities desired.

BRIEF DESCRIPTION OF THE DRAWINGS

The objects and many of the attendant advantages of the present invention will be readily appreciated as the same becomes better understood by reference to the following detailed description when considered in conjunction with the accompanying drawings, in which like reference numerals designate like parts, and wherein.

DETAILED DESCRIPTION OF THE DRAWINGS

Figure 1:
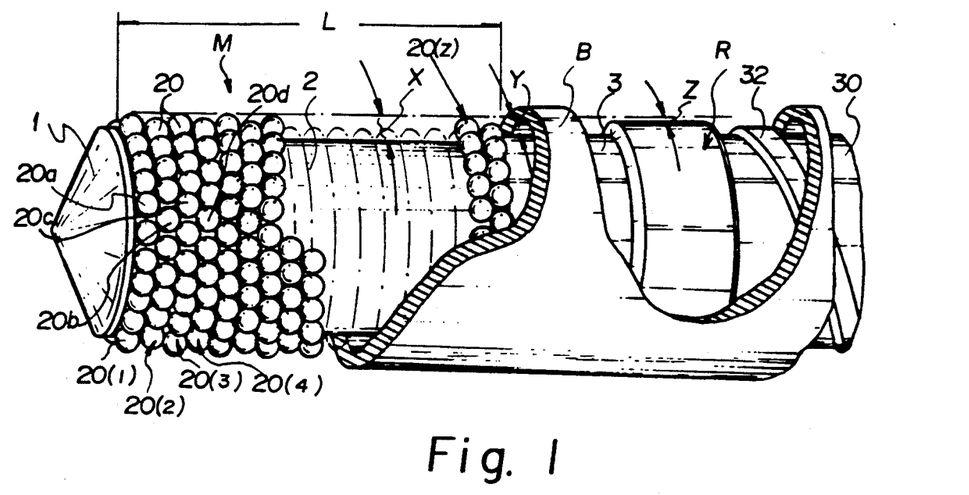
FIG. 1 is a partially cut away perspective view of a first embodiment of the dynamic mixing system of the present invention.

Referring in detail to the drawings with particular reference to Figure a perspective view of one preferred embodiment of a dynamic mixing system M in accordance with the present invention is illustrated as including mixing balls 20 disposed about the surface of a spindle 2 having an end Cap 1 and being connected to the downstream end of an extruder screw 30 having screw flights 32. The mixing balls 20 are arranged in a plurality of circumferential rows 20(1), 20(2), 20(3), 20(4)-13 20(Z) (where Z is a selected whole number) perpendicular to the axis of the cylindrically shaped spindle 2. The circumferential rows 20(1)—20(Z) of balls 20 are disposed in a staggered arrangement so as to be intermeshed or overlapping thereby providing for separation between adjacent balls within each circumferential row 20(1)-20(Z) and point contact between balls from adjacent circumferential rows 20(1)-20(z), 20(2)-20(3), 20(3)-20(4), etc., such as point contact between balls 20a-20b, 20b-20c, 20c-20d, etc., as shown in FIG. 1. Point contact is nominal. In operation the melt actually separates balls sufficiently for lubrication. A barrel B encases the mixing balls and spindle.

Referring further to FIG. 1, the dynamic mixing system M of the present invention is shown to include a spindle z rotatably disposed within a barrel B. The spindle 2 is rotatably disposed within the barrel B so as to include a clearance X sufficient to accommodate the mixing balls 20. For example, the clearance X may be in the range of about $\frac{1}{4}$" to 1" in order to accommodate balls of equal diameter plus a few thousandths of an inch clearance. The spindle 2 in this embodiment is integrally connected at the downstream end of an extruder screw 30 having screw flights 32. The spindle 2 has a length L which is sufficient to accommodate many rows of the mixing balls. For example, the length of the spindle may be in the range of 10" to 50". The spindle 2 also includes an end cap 1 similar to that of the downstream end portion of a conventional extruder screw, but undercut so as to retain the last row of balls. The spindle z is integral with an enlarged transition portion 3 so as to provide for a clearance Y which is similar to that of the end cap 1 and confines the balls 20 upstream. Another transition portion R is disposed adjacent to transition portion 3 and has a clearance Z which is smaller than that of clearance Y. Blowing agent may be injected through the barrel somewhere along the transition portion 3 and the adjacent transition portion R is configured to prevent gas escapement upstream.

Figure 4:
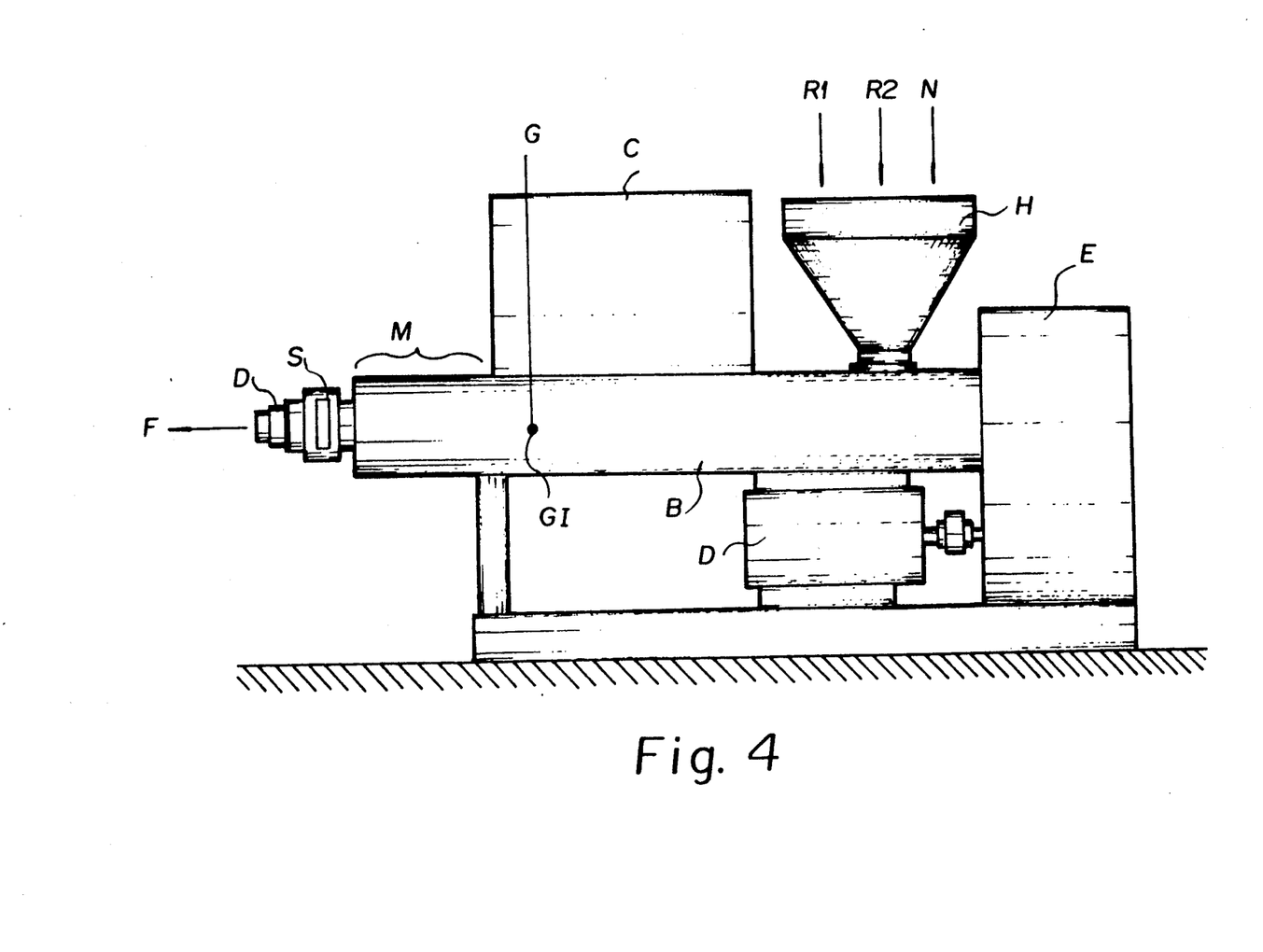
FIG. 4 is a side view of a preferred embodiment of a single extruder extrusion system of the present invention with the mixing and cooling located within the extruder.
Figure 5:
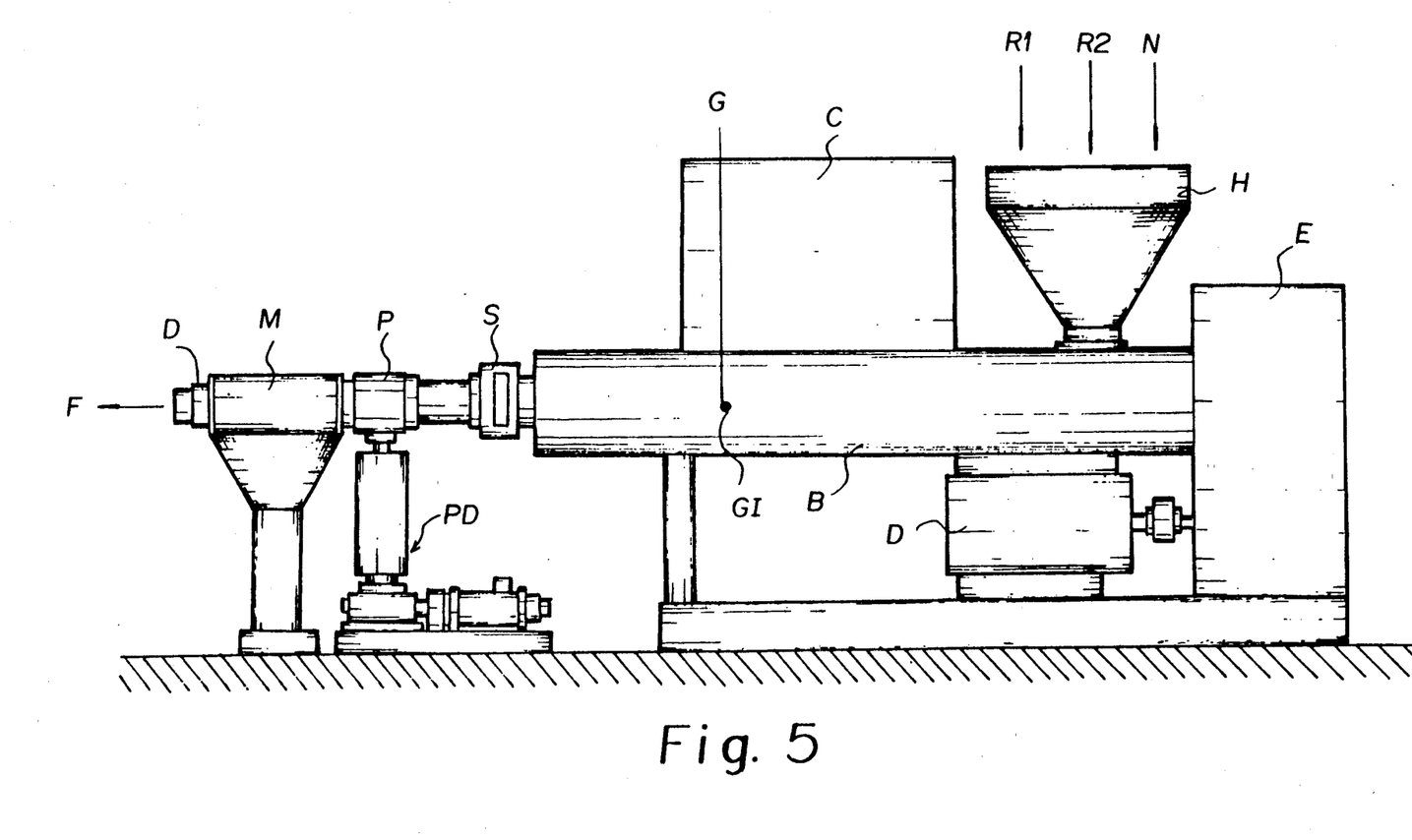
FIG. 5 is a side view of an alternative preferred embodiment of a single extruder extrusion system of the present invention with downstream mixing and cooling.

In the embodiment illustrated in FIG. 1, the spindle 2 is attached to the end of an extruder screw 30 in accordance with the configuration of the extrusion system illustrated in FIG. 4. In such a configuration, a flow of thermoplastic melt is constrained into a tubular configuration by the screw extruder 30 before the flow of melt is forced through the barrel past the adjacent transition portions 3 and R, and into the dynamic mixing system M of the present invention including the spindle 2 and mixing balls 20. However, the orientation of the dynamic mixing system is not limited to this configuration. The dynamic mixing system may be located downstream of the extruder E, screen changer S and pump P as shown in FIG. 5, or it may be between the screen changer S and the pump P. It can be oriented in a vertical, horizontal or tilted manner, along the projected axis of the extruder screw or perpendicular to it, as long as the flow of melt enters the dynamic mixing system at one or several ports and is subjected to the action of all the rotating balls before passing from the exit port to the die. The volume of the dynamic mixing system is preferably in the range of from about 20 to 100 cubic inches. This of course depends upon the total throughput desired from the extrusion system. The rotation rate of the spindle is sufficient to cause the desired mixing action and is preferably in the range of from about 15 to 60 rpm.

Each of the circumferential rows 20(1)—20(Z) typically includes from about 18 to 40 mixing balls 20. The number of circumferential rows typically ranges from about 20 to 100 so as to provide for adequate mixing action. As previously stated, the diameter of the mixing balls 20 may range from about $\frac{1}{4}$" to 1". The staggered arrangement of balls 20 in adjacent ones of the circumferential rows 20(1)-20(Z) of mixing balls advantageously prevents balls in, the same circumferential row from excessive wear by precluding point contact between balls within the same row. Note that balls within the same circumferential row rotate in the same directions upon rotation of the spindle and, therefore, if point contact were allowed between two adjacent balls in the same row, such balls would be subject to severe wear because points of contact between the two balls would be moving in opposite directions. Because of the staggered arrangement of balls 20 in adjacent rows, in accordance with the present invention, the point contact, between balls of adjacent circumferential rows is positioned towards the axis of ball rotation, reducing the relative velocities of the contacting surfaces and causing less wear than if the balls in the same row were permitted to contact. thereby significantly reducing surface wear while maintaining separation of balls in the same row.

The labyrinth arrangement of mixing balls in the dynamic mixing system M of the present invention further advantageously enhances mixing action based not only on mixing ball rotation, but further because of the generation of multiple divisions or dynamic flow paths created in the thermoplastic melt as it flows from row to row of mixing balls in a geometrically progressive manner. For example, eighteen mixing balls 20 per circumferential row in ten circumferential rows 20(1)-20(10) will produce thousands of dynamic flow paths or flow divisions resulting in enhanced mixing action.

The dynamic mixing system of the present invention further advantageously enhances mixing action since the annular flow configuration between the spindle 2 and the barrel B combines with the planetary rotation of the labyrinth of mixing balls 20 to eliminate stagnation and dead regions during the mixing action. The planetary rotation of the mixing balls 20 in the dynamic mixing system of the present invention subjects a high number of molecules in the thermoplastic flow of melt to random movement resulting in an advantageously high amount of complex surface motion. This mixing action generated by the dynamic mixing system causes a high amount of agitation in the flow of melt as the melt is caused to pass between the surfaces of the rotating mixing balls, rotating spindle and barrel. In a typical foam extruder wherein gas is injected into the extruder, the dynamic mixing system of the present invention provides excellent mixing of high viscosity thermoplastic melt with the gas blowing agent, which are two extremely difficult materials to mix together intensively. By providing for improved mixing of these materials, the dynamic mixing system provides for a better quality extruded foam which requires less blowing agent and advantageously shorter heat history, i.e. the time period during which the thermoplastic melt is subjected to elevated temperatures. In this regard, the volume of melt in the tubular mixing space between the barrel B and the spindle 2 is reduced by approximately 70% when filled with balls as described. This is particularly significant in reducing heat history of the melt which avoids degradation by oxygen when air is used as the blowing agent.

Figure 2:
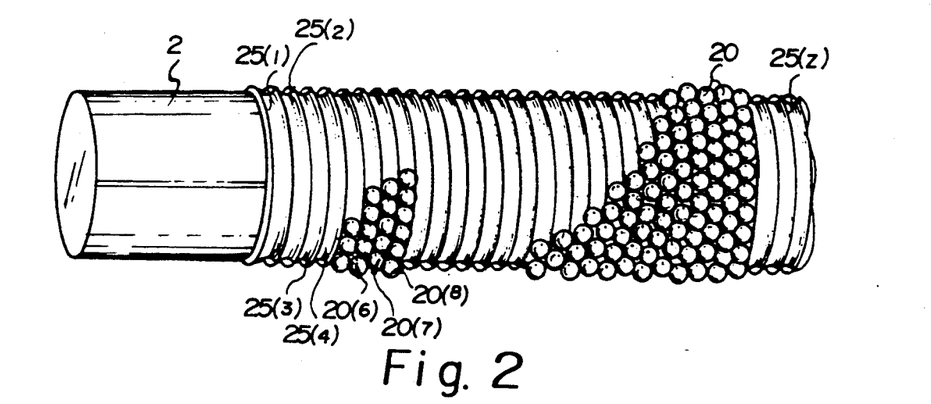
FIG. 2 is a perspective view of a second embodiment of the dynamic mixing system of the present invention showing circumferential grooves.

Referring next to FIG. 2, wherein like components to FIG. 1 bear like designations, a perspective view of a second embodiment of the dynamic mixing system of the present invention is illustrated wherein the spindle 2 includes a plurality of circumferential grooves 25(1)–25(Z) disposed about a cross-section perpendicular to the axis of rotation of the spindle 2, so as to retain a plurality of circumferential rows 20(1)–20(Z) of mixing balls 20, such as those designated 20(6)–20(8).

As compared to the previous embodiment illustrated in FIG. 1, the alternative embodiment of FIG. 2 allows for an increase in the total length of the spindle 2 and, thus, the total number of circumferential rows of mixing balls for more intensive mixing action. By employing the circumferential grooves 25(1)–25(Z), this embodiment provides for higher stress capability so as to accommodate a larger total pressure drop of the thermoplastic melt flow from the upstream to the downstream end of the spindle 2 as loading between downstream circumferential rows of mixing balls increases with the increasing length of the spindle 2. The circumferential grooves 25(1)–25(Z) are dimensioned such that the spacing between adjacent ones of the circumferential rows 20(1)–20(Z) of mixing balls 20 maintains the balls 20 in adjacent ones of said circumferential rows in the staggered arrangement described above with regard to the embodiment in FIG. 1.

Figure 3:
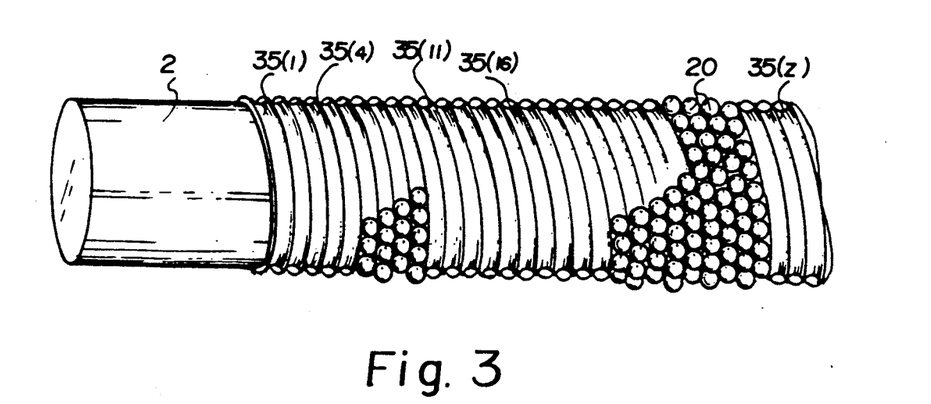
FIG. 3 is a perspective view of a third embodiment of the dynamic mixing system of the present invention showing canted circumferential grooves.

Referring to FIG. 3, wherein like components to FIGS. 1 and 2 bear like designations, a perspective view of a third embodiment of the dynamic mixing system of the present invention is shown wherein a spindle 2 includes a plurality of circumferential grooves 35(1)–35(Z) which are canted with respect to the rotational axis of the spindle and which accommodate respective rows 20(1)–20(Z) of planetary mixing balls 20 therein. The canted circumferential grooves 35(1)–35(Z) correspond to slightly elliptical cross-sections of the spindle 2 as compared to the circumferential grooves 25(1)–25(Z) in the second embodiment described above which correspond to circular cross-sections of the spindle. The canted circumferential grooves 35 allow the mixing balls 20 to move axially to a certain extent with respect to the spindle 2 so as to "wipe" the interior surface of the barrel B, thereby further eliminating stagnation in the mixing action. The canted circumferential grooves 35 may be slanted to approximately half of their spacing so as to assure total contact between the mixing balls 20 and the surface of the barrel B at least once per revolution of the mixing balls. Preferably, the plane of the circumferential grooves 35 are canted at an angle so as to displace one end at a distance equal to approximately 86% of ball diameter.

In all of the foregoing embodiments the spindle 2 and barrel B may be cooled to whatever degree required for establishing optimum stock temperature, as is typical in extruder and other mixer-cooling devices in commercial use. The spindle 2 and barrel B may each be provided with channels for circulating coolant (water, oil, etc.) therein for accurately controlling the temperature in the dynamic mixing system and stock therein.

In FIG. 4, a preferred embodiment of a single extruder extrusion system for producing foamed thermoplastic resin is illustrated as including an extruder E having an elongated barrel B with an input hopper H positioned at the upstream end of the barrel B to receive resin R1, granulate R2 and, if used, nucleating material N. The extrusion system is operated by controls (not shown) in the control cabinet C. The downstream portion of the barrel B includes the dynamic mixing system M of the present invention. The downstream end of the dynamic mixing system M exhausts through a screen changer s to an extrusion die D from which controllable quantities of extrudate are emitted, for example, in the form of foam sheeting F.

An optional water injection point (not shown) which receives water from a controlled volume water pump may be incorporated into the extrusion system in accordance with the description outlined in U.S. Pat. No. 4,436,679 to Winstead which is herein incorporated by reference.

Gas G is directly introduced into a gas intake GI located in the barrel B upstream of the dynamic mixing system M as schematically shown.

In FIG. 5, an alternative preferred embodiment of the single extruder extrusion system in accordance with the present invention is illustrated, wherein like components to FIG. 4 bear like designations. In this embodiment, it can be seen that the dynamic mixing system M is now located downstream of a screen changer S and a controlled gear pump P. In this configuration, the dynamic mixing system M serves to both thoroughly mix and cool the extrudate, which may include entrained blowing agent, and delivers the extrudate to the outlet die D from which it is emitted in the form of foam sheeting F or the like.

The controlled volume pump P is preferably a gear pump having a variable speed drive PD which is set at a level to establish overall output at the desired number of pounds per hour.

Another advantage of the planetary mixing balls 20 employed in the present invention is that the mixing balls also act as a bearing support for the downstream end of the screw, thus significantly reducing screw wear. When the mixer is a separate device as in FIG. 5, no sleeve or other end bearings are required to support the shaft (spindle), which is a necessary evil in other mixers and coolers described in existing art. The balls not only provide the mixing action but also act as bearings in this design. Only simple seals are required at the open ends of the apparatus in this design.

Figure 6:
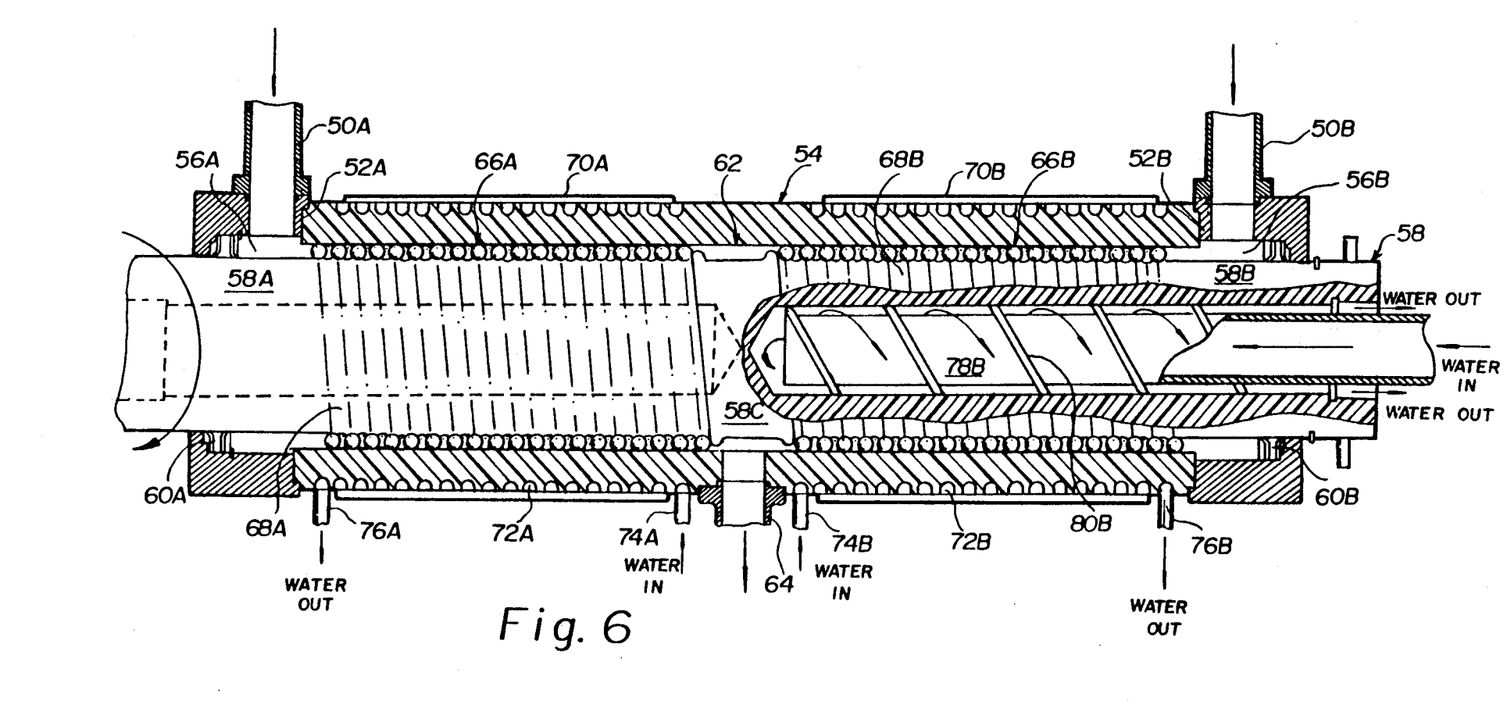
FIG. 6 is a cross-sectional schematic illustration of a dynamic mixer/cooler of the present invention.

Referring to FIG. 6, an independent dynamic mixer/cooler DMC, such as that suitable for use as the dynamic mixer M in the embodiment of FIG. 5 will now be described.

Plastic melt or other viscous material to be mixed and cooled is received at two inlet pipes 50A and 50B which deliver melt to inlet ports 52A and 52B, respectively, on opposite ends of a mixer/cooler barrel housing 54. Immediately within the inlet ports 52A and 52B are inlet chambers 56A and 56B, which surround the upstream ends of rotary spindle portions 58A and 58B, respectively of rotary spindle 58. Rotary shaft end seals 60A and 60B are respectively provided on the spindle portions 58A and 58B to seal the ends of the mixer/cooler barrel housing 54 while permitting the spindle portions 58A and 58B to protrude therefrom whereby suitable driving means (not shown) can be provided to rotate the spindle 58 in any desired direction of rotation. The rotational arrows at the outer ends of the spindle portions 58A, 58B are for illustrative purposes only. The direction of rotation is not critical to the operation of the dynamic mixer/cooler DMC. It should be noted that because of the planetary ball bearing mixing structures of the present invention, no shaft end bearings are needed for the spindles 58A, 58B as will be more fully described hereinafter.

The spindle portions 58A and 58B extend to a median position or waistline 58C within the barrel housing 54 so as to define an annular exhaust or outlet chamber 62 which is in turn connected to an exhaust or outlet port 64. The cooled and mixed melt or other viscous material is emitted from the outlet part 64 and directed to an extrusion die or the like such as the die D of FIG. 5.

Melt entering the inlets 52A, 52B is at a first temperature which is to be changed, such as by cooling, to a desired controlled temperature at the outlet part 64. This is accomplished by heat exchange between the melt, the internal surfaces of the barrel housing 54 and the external surfaces of the rotary spindle portions 58A, 58B.

The rotary spindle portions 58A, 58B carry sets of mixing balls 66A and 66B, respectively, maintained in respective sets of canted circumferential grooves 68A and 68B in the manner described previously in connection with FIG. 3. The mixing balls 66A and 66B thus provide a scrubbing action to preclude the stagnation of melt on the interior surface of the barrel housing 54 and thereby enhance heat exchange between the melt and the barrel housing 54.

Temperature control of the barrel housing 54 is provided with water jackets 72A and 72B, having respective inlets 74A and 74B and outlets 76A and 76B. The water jackets 70A and 70B are positioned substantially coextensively with those lengths of the rotary spindle portions 58A and 58B carrying the mixing ball sets 66A and 66B. Further temperature control via the rotary spindle portions 58A and 58B is provided by making these spindle portions hollow and inserting therein the heat exchange tube assemblies, such as 78B shown in the right-hand spindle portion 58B, having spiral fluid flow paths defined by a spiral vane structure 80B constraining fluid flowing into the tube 70B to exit the right-hand spindle portion 58B via a spiral path in heat exchange relationship with the interior of the said spindle portion 58B. This flow is indicated by the arrows within the right-hand spindle portion 58B. A similar structure (not shown) is provided within the left-hand spindle portion 58A. Thus, the temperatures of both the barrel housing 54 and the spindle portions 58A and 58B are regulated, such that the incoming melt is mixed by the planetary action of the mixing ball sets 66A and 66B and constrained by the pressure applied by the upstream gear pump, extruder or the like and the said planetary action of the mixing ball sets 66A and 66B to exchange heat with the barrel housing 54 and spindle portions 58A, 58B such that the temperature of the melt, at the outlet 64, is controlled to the optimum desired temperature for the downstream process to be undertaken with that melt. In the context of the present example, that process would be the extrusion of the melt.

As previously noted, the orientation of the dynamic mixing apparatus of the present invention can be in-line, perpendicular or askew of the longitudinal axis of the extruder. So long as the flow of melt enters the dynamic mixing system and is constrained to flow through the planetary labyrinth of mixing balls 20 before exiting the apparatus, the dynamic mixing function (and temperature control function) of the system will be accomplished.

By way of further example, whereas FIG. 6 shows the entry path ports 52B, 52B at the ends of the barrel housing 54 with the exit port 64 in the middle, the structure can also be connected in an in-line configuration in which the melt could flow into one entry port 52A and exit from the other entry port 52B, depending upon the connected configuration of the import pipes 50A and 50B and the closing of the outlet port 64. Thus, the apparatus of FIG. 6 could be used in the in-line configuration of the dynamic mixer M generally illustrated in FIG. 5.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic mixing apparatus for intensively mixing thermoplastic melt with ingredients contained therein, which comprises:
   source means providing a flowing mass of thermoplastic melt; and
   dynamic mixing means receiving and mixing said thermoplastic melt form said source means, comprising:
   inlet means receiving said thermoplastic melt;
   barrel means having an inner cylindrical surface;
   spindle means having a cylindrical surface configuration and being rotatable disposed within said barrel means to define a mixing space for receiving said thermoplastic melt between the said surfaces of said barrel means and spindle means;
   a labyrinth of mixing balls disposed in said mixing space in circumferential rows about the said surface of said spindle;
   said mixing balls being responsive to the rotation of said spindle to rotate in a planetary manner about said spindle to impart an intensive mixing action to said thermoplastic melt;
   the mixing balls in respectively adjacent rows being in staggered relationship with one another to provide a labyrinth of dynamic flow paths for said thermoplastic melt; and
   outlet means for receiving mixed thermoplastic melt from said mixing space downstream of said inlet means.

2. The dynamic mixing apparatus of claim 1, wherein said mixing balls in said plurality of circumferential rows are intermeshed such that there is a separation between adjacent balls within each circumferential row and point contact between balls in adjacent circumferential rows.

3. The dynamic mixing apparatus of claim 1, further comprising a plurality of circumferential grooves formed in the surface of said spindle means for retaining said circumferential rows of mixing balls.

4. The dynamic mixing system of claim 3, wherein the staggered arrangement of said mixing balls includes a plurality of circumferential rows which are intermeshed such that there is a separation between adjacent balls within each circumferential row and point contact between balls from adjacent circumferential rows.

5. The dynamic mixing system of claim 1, further comprising a plurality of canted circumferential grooves formed in the surface of said spindle means for retaining said circumferential rows of mixing balls.

6. The dynamic mixing apparatus of claim 5, wherein said mixing balls in said plurality of circumferential rows are intermeshed such that there is a separation between adjacent balls within each circumferential row and point contact between balls in adjacent circumferential rows.

7. The dynamic mixing apparatus of claim 1, wherein said barrel means and said spindle means of said dynamic mixing means further include heat exchange means for controlling the temperature of said mixed thermoplastic melt between said inlet means and said outlet means of said dynamic mixing means.

8. The dynamic mixing apparatus of claim 7, wherein said mixing balls in said plurality of circumferential rows are intermeshed such that there is a separation between adjacent balls within each circumferential row and point contact between balls in adjacent circumferential rows.

9. The dynamic mixing apparatus of claim 7, further comprising a plurality of circumferential grooves formed in the surface of said spindle means for retaining said circumferential rows of mixing balls.

10. The dynamic apparatus of claim 9, wherein said mixing balls in said plurality of circumferential rows are intermeshed such that there is a separation between adjacent balls within each circumferential row and point contact between balls in adjacent circumferential rows.

11. The dynamic mixing system of claim 7, further comprising a plurality of canted circumferential grooves formed in the surface of said spindle means for retaining said circumferential rows of mixing balls.

12. The dynamic mixing apparatus of claim 11, wherein said mixing balls in said plurality of circumferential rows are intermeshed such that there is a separation between adjacent balls within each circumferential row and point contact between balls in adjacent circumferential rows.

13. The dynamic mixing apparatus of claim 1 wherein said mixing balls occupy on the order of 70% of the mixing space containing said labyrinth.

14. A dynamic mixing apparatus for intensively mixing thermoplastic melt with ingredients contained therein, said thermoplastic melt being in a flowing pressurized mass, comprising:
   housing means having an inner cylindrical surface;
   spindle means having a cylindrical surface configuration and being rotatable disposed within said housing means to define a mixing space for receiving said thermoplastic melt between the said surfaces of said barrel means and said spindle means;
   said mixing space having upstream and downstream locations relative to the flow of thermoplastic melt therethrough;
   inlet means and outlet means at respective upstream and downstream locations in said mixing space for receiving and discharging respectively said thermoplastic melt; and
   planetary mixing means defining a labyrinth of dynamic flow paths between said inlet and outlet means within said mixing space, comprising:
   a plurality of mixing balls disposed in circumferential rows about the said surface of said spindle;
   said mixing balls being responsive to the rotation of said spindle within said housing to rotate in a planetary manner about said spindle in said thermoplastic melt to constrain said melt to follow a geometrically increasing labyrinth of flow paths between said inlet means and said outlet means to thereby intensively mix said thermoplastic melt within said mixing space.

15. The dynamic mixing apparatus of claim 14, wherein said mixing balls provide bearing support for said spindle within said housing.

16. The dynamic mixing apparatus of claim 14, wherein said mixing balls in respectively adjacent rows are in staggered relationship with one another to provide said labyrinth of dynamic flow paths.

17. The dynamic mixing apparatus of claim 16, wherein said mixing balls provide bearing support for said spindle within said housing.

18. The dynamic mixing apparatus of claim 16, wherein said mixing balls in said plurality of circumferential rows are intermeshed such that there is a separation between adjacent balls within each circumferential row and point contact between balls in adjacent circumferential rows.

19. The dynamic mixing apparatus of claim 18, wherein said mixing balls provide bearing support for said spindle within said housing.

20. The dynamic mixing apparatus of claim 14, further comprising a plurality of circumferential grooves formed in the surface of said spindle means for retaining said circumferential rows of mixing balls.

21. The dynamic mixing apparatus of claim 20, wherein said mixing balls provide bearing support for said spindle within said housing.

22. The dynamic mixing apparatus of claim 20, wherein said mixing balls in said plurality of circumferential rows are intermeshed such that there is a separation between adjacent balls within each circumferential row and point contact between balls in adjacent circumferential rows.

23. The dynamic mixing apparatus of claim 22, wherein said mixing balls provide bearing support for said spindle within said housing.

24. The dynamic mixing system of claim 14, further comprising a plurality of canted circumferential grooves formed in the surface of said spindle means for retaining said circumferential rows of mixing balls.

25. The dynamic mixing apparatus of claim 24, wherein said mixing balls provide bearing support for said spindle within said housing.

26. The dynamic mixing apparatus of claim 24, wherein said mixing balls in said plurality of circumferential rows are intermeshed such that there is a separation between adjacent balls within each circumferential row and point contact between balls in adjacent circumferential rows.

27. The dynamic mixing apparatus of claim 26, wherein said mixing balls provide bearing support for said spindle within said housing.

28. The dynamic mixing apparatus of claim 14, which further includes heat exchange means for controlling the temperature of said mixed thermoplastic melt in said mixing space.

29. The dynamic mixing apparatus of claim 28, wherein said mixing balls provide bearing support for said spindle within said housing.

30. The dynamic mixing apparatus of claim 28, wherein said mixing balls in respectively adjacent rows are in staggered relationship with one another to provide said labyrinth of dynamic flow paths.

31. The dynamic mixing apparatus of claim 30, wherein said mixing balls provide bearing support for said spindle within said housing.

32. The dynamic mixing apparatus of claim 14, wherein said mixing balls occupy on the order of 70% of the mixing space containing said labyrinth.

33. The method of incorporating blowing agents in a flowing mass of thermoplastic melt which obviates the need for fluorocarbon blowing agents int he production of foamed thermoplastics, comprising:
providing a mixing space of substantially tubular configuration having an inlet and an outlet;
providing a labyrinth of dynamic flow paths in said mixing space which increase in number in geometric progression from said inlet to said outlet;
delivering a flowing mass of thermoplastic melt containing entrained blowing agent into said inlet and constraining said melt to flow through said labyrinth of flow paths to said outlet while orbiting said labyrinth in planetary fashion within said tubular mixing space.

34. The method of claim 33, which further includes:
defining said mixing space with concentric inner and outer cylindrical surfaces;
defining said labyrinth of dynamic flow paths in said mixing space by a plurality of mixing balls arranged in adjacent concentric circumferential rows on said inner cylindrical surface from said inlet to said outlet, with mixing balls in respectively adjacent rows being staggered with one another; and
imparting relative rotation to said inner surface and said outer surface to constrain said mixing balls to orbit said inner surface within said mixing space.

35. The method of claim 33, wherein said blowing agent is devoid of fluorocarbons.

36. The method of claim 35, which further includes:
defining said mixing space with concentric inner and outer cylindrical surfaces;
defining said labyrinth of dynamic flow paths in said mixing space by a plurality of mixing balls arranged in adjacent concentrate circumferential rows on said inner cylindrical surface from said inlet to said outlet, with mixing balls in respectively adjacent rows being staggered with one another; and
imparting relative rotation to said inner surface and said outer surface to constrain said mixing balls to orbit said inner surface within said mixing space.

37. The method of claim 33, wherein said blowing agent is selected from the group consisting of water, air, nitrogen, carbon dioxide, and other gases devoid of fluorocarbons.

38. The method of claim 37, which further includes:
defining said mixing space with concentric inner and outer cylindrical surfaces;
defining said labyrinth of dynamic flow paths in said mixing space by a plurality of mixing balls arranged in adjacent concentric circumferential rows on said inner cylindrical surface from said inlet to said outlet, with mixing balls in respectively adjacent rows being staggered with one another; and
imparting relative rotation to said inner surface and said outer surface to constrain said mixing balls to orbit said inner surface within said mixing space.

39. The method of incorporating and mixing materials in a homogeneous manner in a flow mass of thermoplastic melt, comprising:
providing a mixing space of substantially tubular configuration having an inlet and an outlet;
providing a labyrinth of dynamic flow paths in said mixing space which increase in number in geometric progression from said inlet to said outlet; and
delivering a flowing mass of thermoplastic melt containing entrained material to be mixed therewith into said inlet and constraining said melt to flow through said labyrinth of dynamic flow paths to said outlet while orbiting said labyrinth in planetary fashion within said tubular mixing space.

40. The method of claim 39, which further includes;
defining said mixing space with concentric inner and outer cylindrical surfaces;
defining said labyrinth of dynamic flow paths in said mixing space by a plurality of mixing balls arranged in adjacent concentric circumferential rows on said inner cylindrical surface from said inlet to said outlet, with mixing balls in respectively adjacent rows being staggered with one another; and
imparting relative rotation to said inner surface and said outer surface to constrain said mixing balls to orbit said inner surface within said mixing space.

41. The method of claim 39, wherein said entrained material to be mixed is selected from the group consisting of nucleating agents, pigments, fillers, chemical blowing agents devoid of fluorocarbons and lubricants.

42. The method of claim 41, which further includes:
defining said mixing space with concentric inner and outer cylindrical surfaces;
defining said labyrinth of dynamic flow paths in said mixing space by a plurality of mixing balls arranged in adjacent concentric circumferential rows on said inner cylindrical surface from said inlet to said outlet, with mixing balls in respectively adjacent rows being staggered with one another; and
imparting relative rotation to said inner surface and said outer surface to constrain said mixing balls to orbit said inner surface within said mixing space.

* * * * *